(12) United States Patent
Villard et al.

(10) Patent No.: US 7,575,165 B2
(45) Date of Patent: Aug. 18, 2009

(54) PORTABLE OBJECT HAVING MULTI-LEVEL DEMODULATION AND BEING INDUCTIVELY COUPLED TO A FIXED STATION

(75) Inventors: Patrick Villard, Grenoble (FR); Nicolas Delorme, Grenoble (FR); Cyril Condemine, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 604 days.

(21) Appl. No.: 10/570,267

(22) PCT Filed: Sep. 14, 2004

(86) PCT No.: PCT/FR2004/002325

§ 371 (c)(1),
(2), (4) Date: Mar. 2, 2006

(87) PCT Pub. No.: WO2005/029726

PCT Pub. Date: Mar. 31, 2005

(65) Prior Publication Data

US 2006/0281405 A1     Dec. 14, 2006

(30) Foreign Application Priority Data

Sep. 17, 2003     (FR) ................................... 03 10928

(51) Int. Cl.
*G06K 7/00*     (2006.01)
(52) U.S. Cl. ....................................... 235/435; 235/492
(58) Field of Classification Search ................ 235/435, 235/492, 486, 487, 441, 382, 382.5
See application file for complete search history.

(56) References Cited

U.S. PATENT DOCUMENTS 6,028,503 A     2/2000     Preishuberpflugl et al.

(Continued)

FOREIGN PATENT DOCUMENTS

WO     WO 00/03352     1/2000

(Continued)

OTHER PUBLICATIONS

Ribner; "A Comparison of Modulator Networks for High-Order Oversampled ΣΔ Analog-to-Digital Converters"; IEEE Transactions on Circuits and Systems; Feb. 1991; No. 2; pp. 145-159.

*Primary Examiner*—Thien M Le
(74) *Attorney, Agent, or Firm*—Oliff & Berridge, PLC

(57) ABSTRACT

A remote transmission device having a fixed station and a portable object provided with an antenna inductively coupled to the station, the object having a variable load impedance connected to terminals of the antenna, and a regulation loop regulating the voltage at terminals of the variable load impedance having rectifier means for rectifying the voltage at the terminals of the antenna and control means designed to modify the variable load impedance according to the output voltage of the rectifier means, and the station emitting an alternating magnetic field modulated in amplitude on $2^N$ levels by data to be transmitted, encoded on N bits, the object having demodulation means having an n-bit analog to digital converter, clocked at an oversampling frequency much higher than the frequency of the data and connected between the rectifier means and the control means, and digital processing means connected to the output of the converter.

10 Claims, 8 Drawing Sheets

U.S. PATENT DOCUMENTS

| | | | |
|---|---|---|---|
| 2005/0225436 A1* | 10/2005 | Diorio et al. | 340/10.51 |
| 2008/0087723 A1* | 4/2008 | Kargl et al. | 235/380 |
| 2008/0157928 A1* | 7/2008 | Butler et al. | 340/10.1 |
| 2008/0164977 A1* | 7/2008 | Butler et al. | 340/10.1 |
| 2008/0180249 A1* | 7/2008 | Butler et al. | 340/572.1 |
| 2008/0186138 A1* | 8/2008 | Butler et al. | 340/10.1 |

FOREIGN PATENT DOCUMENTS

| | | |
|---|---|---|
| WO | WO 00/63830 | 10/2000 |

\* cited by examiner

PORTABLE OBJECT HAVING MULTI-LEVEL DEMODULATION AND BEING INDUCTIVELY COUPLED TO A FIXED STATION

BACKGROUND OF THE INVENTION

The invention relates to a portable object provided with an antenna inductively coupled to a fixed station of a remote transmission device, the portable object comprising a variable load impedance, connected to terminals of the antenna, and a control loop for regulating the voltage at terminals of the load impedance comprising rectifier means for rectifying the voltage at the terminals of the antenna and control means designed to modify the load impedance according to the output voltage of the rectifier means.

STATE OF THE ART

As represented in FIG. 1, inductive coupling is conventionally used for remote transmission of data between a portable object 1, in particular of the type constituted by smart cards, tickets, contact-less labels, known under the name of RFID (radiofrequency identification) labels, etc., and a fixed station 2, for example constituted by a card reader, a RFID reader, etc., in the field of object identification, access control, remote toll payment, etc.

The document WO-A-00/63830 describes a fixed station coupled to a standard passive RFID label with variable load impedance.

In most remote transmission devices of this type, the portable object 1 is passive. It is remote supplied with power by the fixed station 2, which comprises its own power supply circuit, by means of the inductive coupling which is achieved by antennas 3 and 4, formed by coils. These devices generally use the load modulation principle.

Transmission of binary data from the fixed station 2 to the portable object 1 is conventionally performed, in particular in the document WO-A-00/03352, by amplitude shift keying (ASK). As represented in FIG. 2, the amplitude of the magnetic field H emitted by the fixed station 2 and received by the portable object 1 takes a first value when the data signal to be transmitted takes the binary value 0 and a second value, lower than the first one in FIG. 2, when the data signal to be transmitted takes the binary value 1.

The antenna 3 of the portable object 1 is the seat of an electromotive force which creates an AC voltage Vac, at the terminals of the antenna 3, the amplitude of which voltage depends, among other things, on the magnetic field emitted by the fixed station, on the load impedance Z connected in parallel to the antenna 3 and on the distance between the portable object and the fixed station. To detect this amplitude and to enable remote power supply of the portable object 1, the latter comprises a rectifier circuit 5 connected to the output of the antenna 3, as represented in FIG. 1. A DC voltage Vdc, the amplitude whereof is representative of the transmitted data, is therefore produced at the output of the rectifier circuit 5, from the voltage at the terminals of the coil of the antenna 3, induced by the magnetic field emitted by the reader 2.

The rectifier circuit 5 can be formed by any suitable circuit enabling an AC voltage Vac to be transformed into a DC voltage Vdc. It can for example be formed by one of the circuits represented in FIGS. 3 to 6 and conventionally comprising, respectively, a diode (FIG. 3), a diode bridge (FIG. 4) or a half-wave rectifier circuit (FIG. 5) or a full-wave rectifier circuit (FIG. 6) using MOS type transistors.

The magnetic field seen by the portable object 1 varies rapidly with the distance separating the portable object from the reader 2. The electromotive force induced in the antenna 3 of the portable object 1 can thus vary in large proportions. As the portable object 1 is essentially constituted by an integrated circuit connected to the antenna 3, this circuit is generally protected by means for limiting the voltage at the terminals of the antenna, thus enabling standard low-voltage technologies to be used, which are less expensive than high-voltage technologies. It is known to use for this a shunt-type regulation circuit the principle whereof is illustrated in FIG. 1. The regulation circuit of FIG. 1 comprises a regulator 6 connected to the output of the rectifier circuit 5 and controlling the value of the load impedance Z, connected to the terminals of the antenna 3, according to the output DC voltage Vdc of the rectifier circuit 5.

In a first embodiment of the regulator 6, illustrated in FIG. 7, the DC voltage Vdc is applied via a resistor R1 to the source of a PMOS transistor T, having its drain grounded via a resistor R2, while a reference voltage Vref is applied to the gate of the transistor T. The regulator thus supplies a control voltage Vc designed to control the value of the variable load impedance Z. The PMOS transistor can be replaced by a bipolar transistor of PNP type, or by a JFET type transistor.

In the alternative embodiment illustrated in FIG. 8, the regulator 6 comprises a divider bridge formed by two resistors, R3 and R4, connected in series between the output of the rectifier circuit 5 and ground, and an amplifier 7 having an input (positive in the figure) connected to the mid-point of the divider bridge and another input (negative in the figure) connected to the reference voltage Vref.

The variable load impedance Z can be formed by a transistor T, for example of MOSFET, JFET or bipolar type, having a control electrode connected to the output of the regulator 6. The voltage Vdc is thus regulated to a value dependent on the reference voltage Vref, which regulates and limits the voltage at the terminals of the antenna 3. The variable impedance can also be formed by any other known means, for example by a bundle of resistors to be connected or disconnected selectively from the antenna 3 according to the value of the DC voltage Vdc.

Numerous potential applications, for example biometric identification, require a large quantity of data to be transferred in a time that has to remain sufficiently low for a user to consider that transmission is almost instantaneous. An increase of the frequency of the binary data signal could enable the binary transmission rate to be increased. However, such an increase would have the consequence of increasing the necessary passband. Increasing the passband would however require the quality factor of the label to be reduced, to the detriment of the remote power supply performances.

OBJECT OF THE INVENTION

The object of the invention is to provide a portable object of a remote transmission device by inductive coupling enabling the transmission rate of the data to be transmitted between the fixed station and the portable object to be increased and not presenting these shortcomings.

According to the invention, this object is achieved by a portable object according to the appended claims and, more particularly by the fact that the fixed station emitting an alternating magnetic field modulated in amplitude on $2^N$ levels by data to be transmitted, encoded on N bits, the portable object comprises demodulation means comprising an n-bit analog-to-digital converter, clocked at an oversampling frequency much higher than the frequency of the data and connected between the rectifier means and the control means, and digital processing means connected to the output of the converter.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 9:
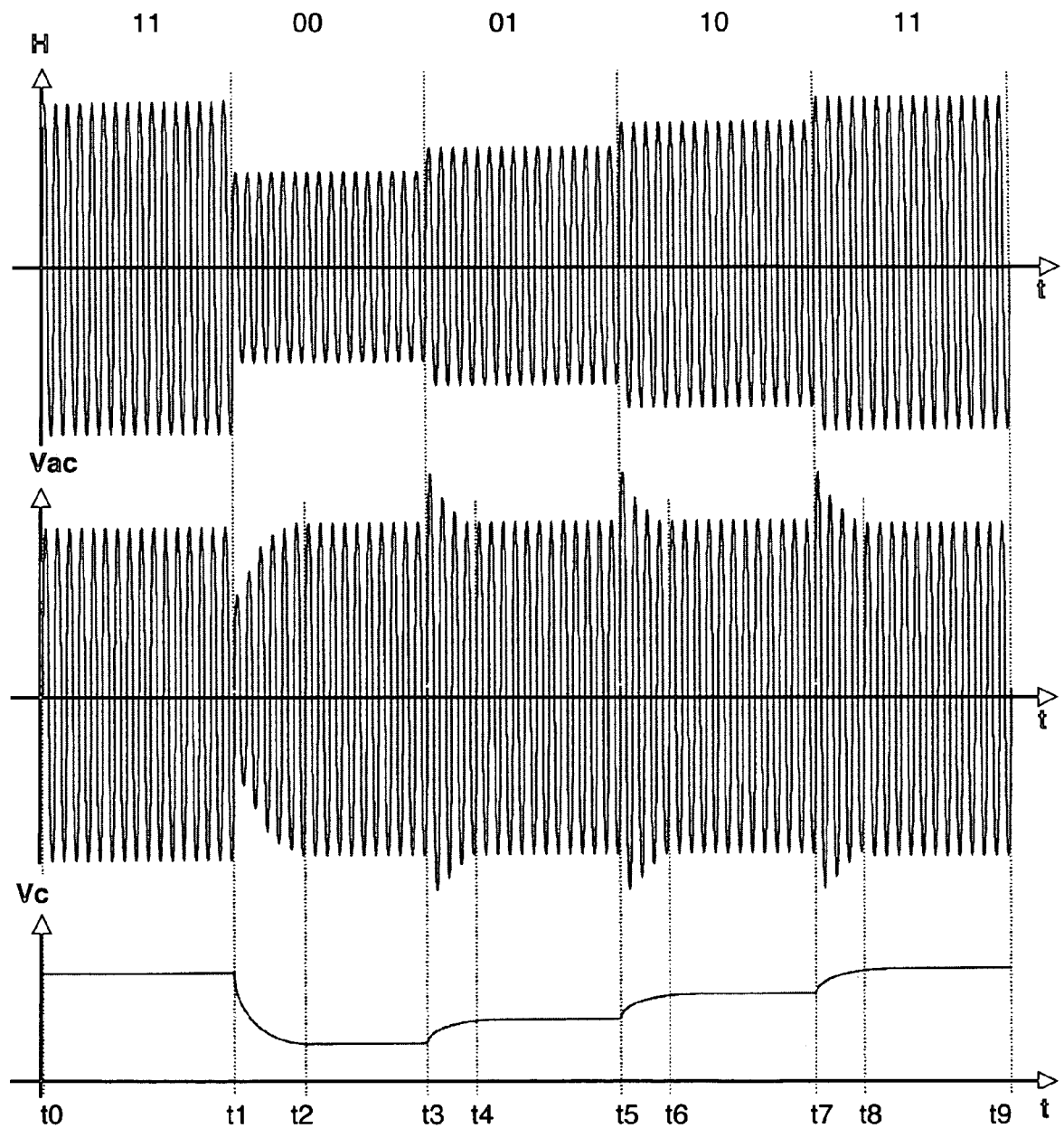
FIG. 9 represents different signals obtained in a device according to FIG. 1 using a 4 levels modulation.

The device according to the invention uses multi-level modulation. Thus, the amplitude of the alternating magnetic field H emitted by the fixed station 2 is modulated on $2^N$ levels by data to be transmitted, encoded on N bits, with $N \geq 1$. In the particular embodiment represented in FIG. 9, the data are encoded in the form of 2-bit words (N=2) and the amplitude of the emitted magnetic field can thus take 4 different values respectively corresponding to the different values (00, 01, 10 and 11) of the data to be transmitted. In FIG. 9, the emitted field has a minimum amplitude to transmit a datum 00 (between the times t1 and t3), then respectively takes higher first and second intermediate values to respectively transmit the data 01 (between the times t3 and t5) and 10 (between the times t5 and t7), and a maximum value to transmit the datum 11 (between the times t0 and t1 and between the times t7 and t9).

Figure 1:
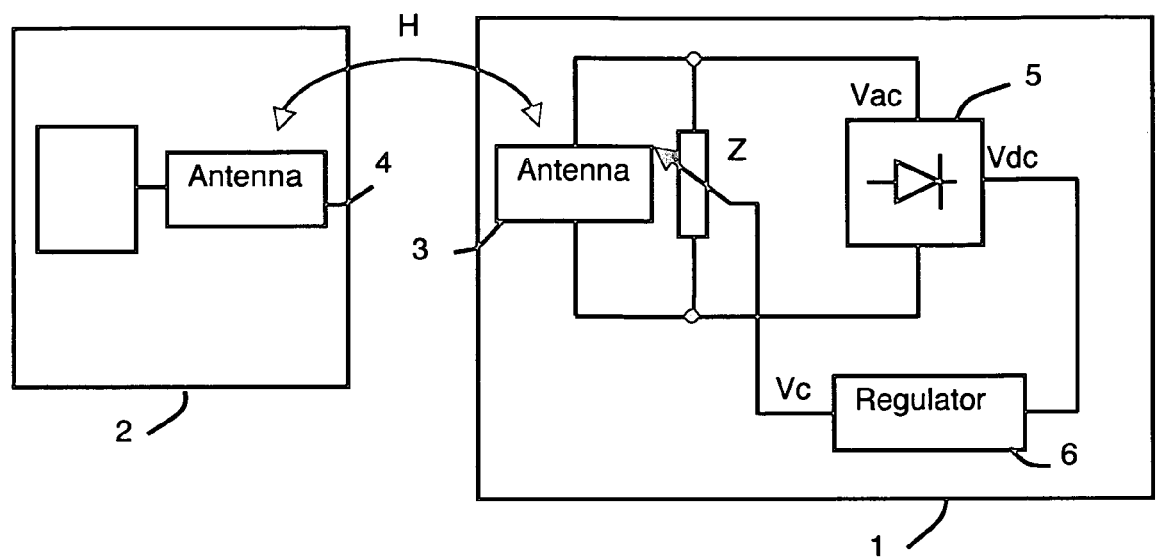
FIG. 1 schematically illustrates a remote transmission device with inductive coupling according to the prior art.
Figure 2:
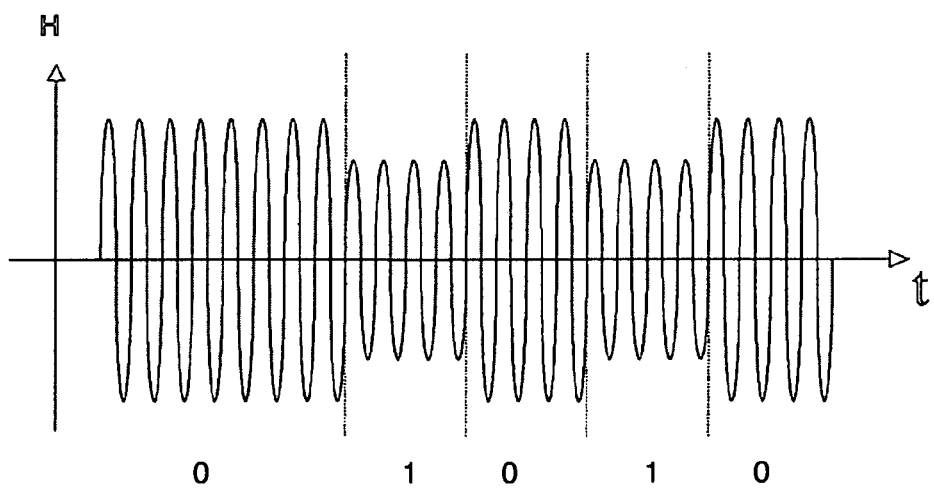
FIG. 2 represents the variations of the magnetic field H, emitted by the fixed station, versus the value of the binary data signal to be transmitted to the portable object of a device according to FIG. 1.
Figure 3:
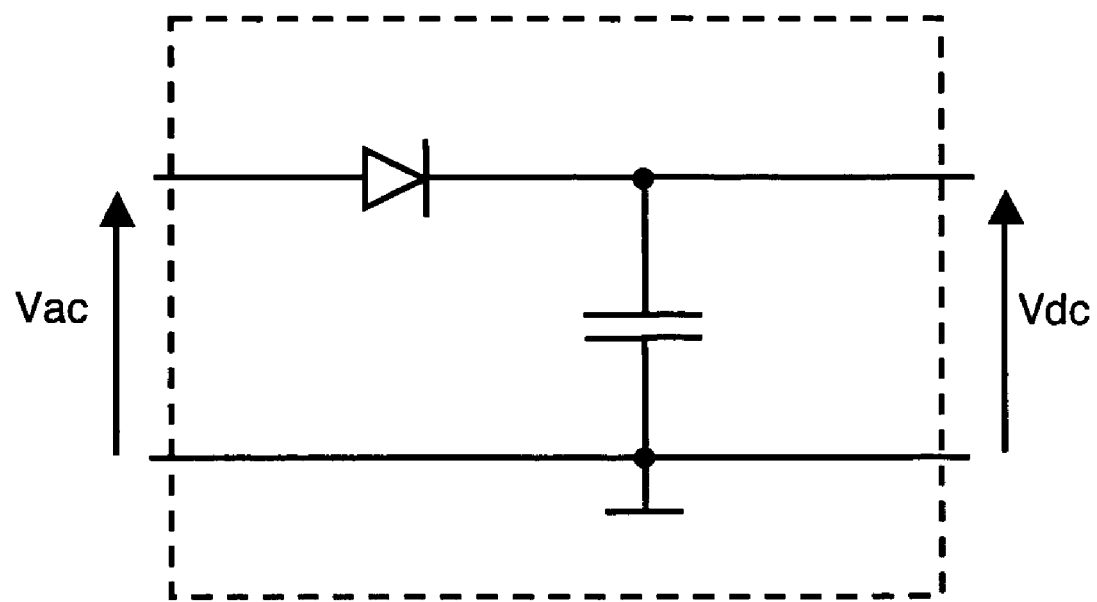
FIGS. 3 to 6 represent various alternative embodiments of a rectifier circuit of a device according to the prior art.
Figure 4:
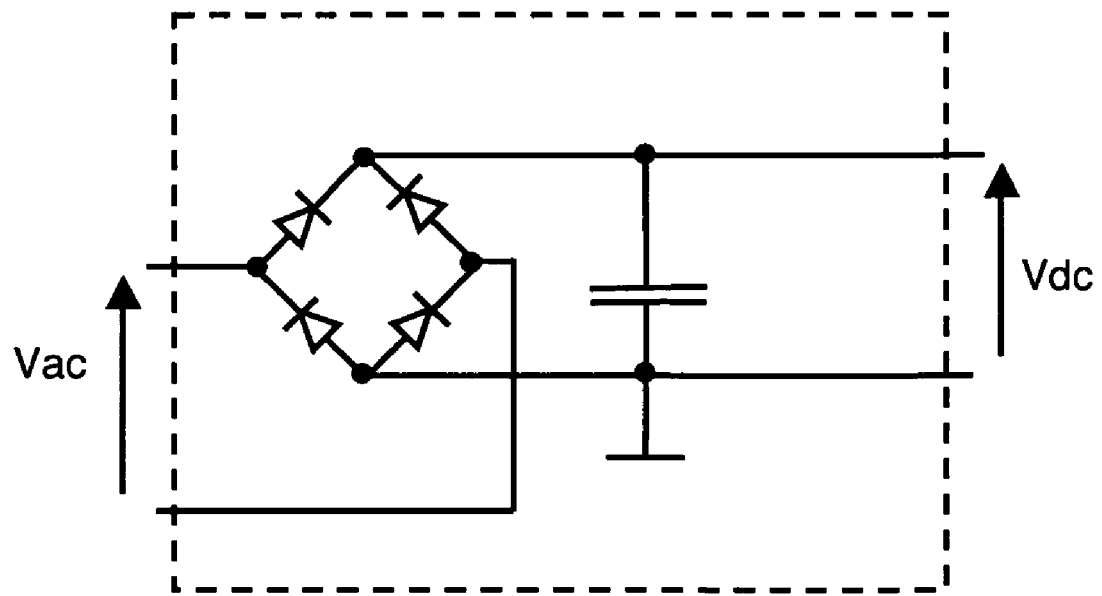
Figure 5:
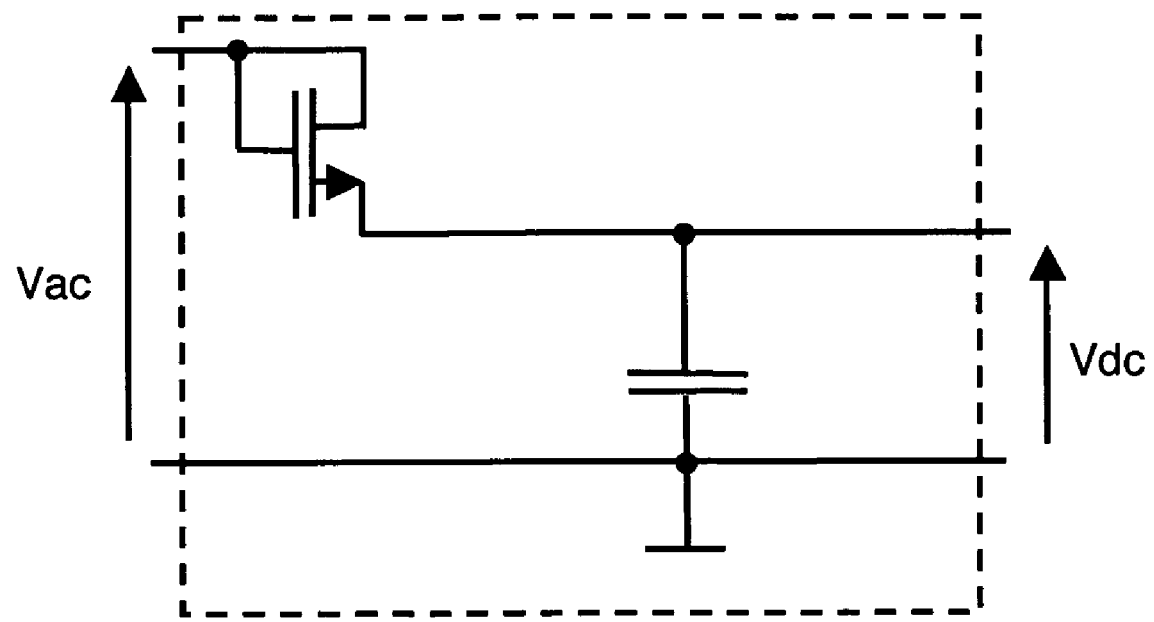
Figure 6:
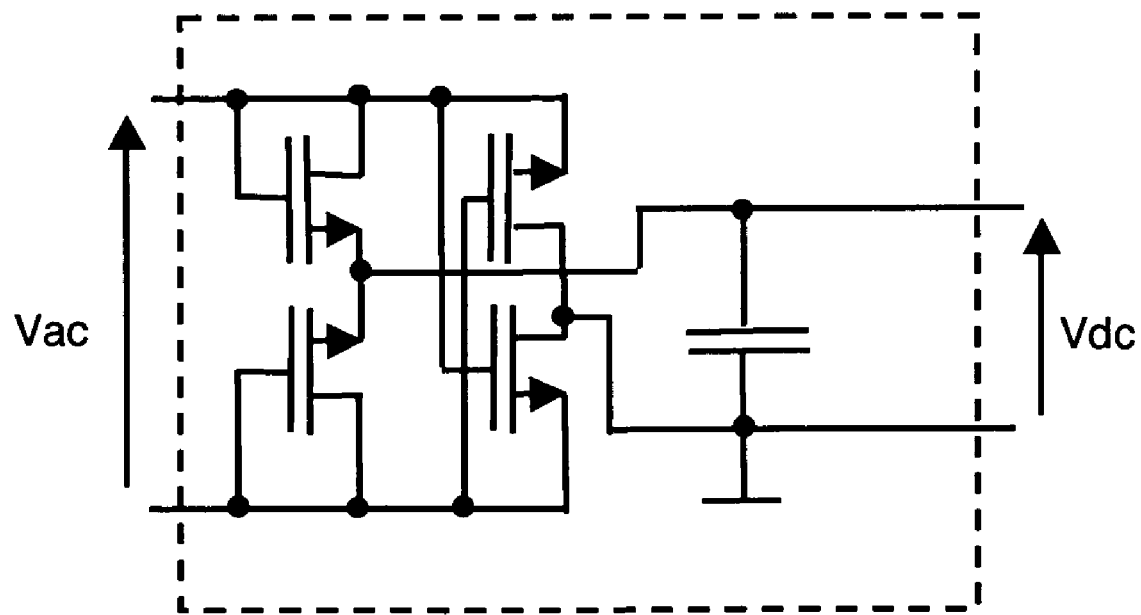
Figure 7:
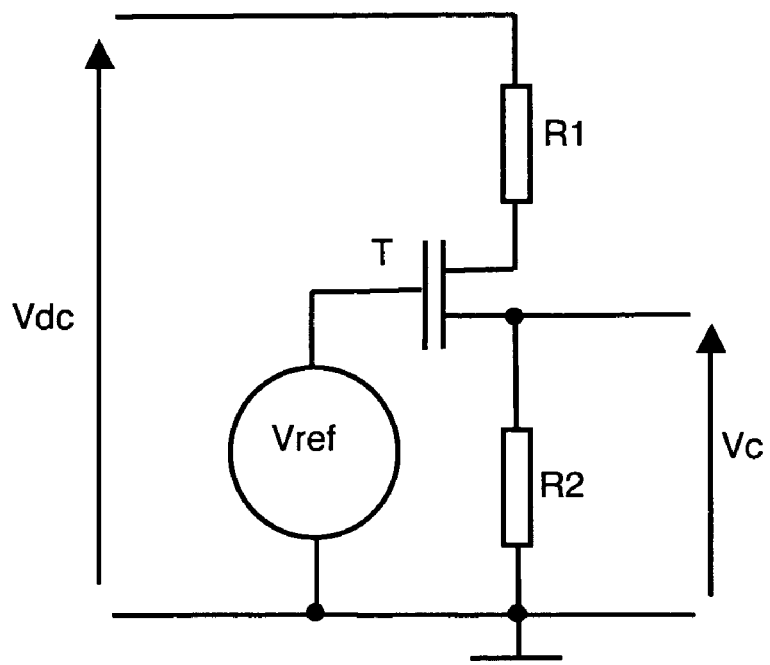
FIGS. 7 and 8 illustrate two alternative embodiments of a regulator of a device according to the prior art.
Figure 8:
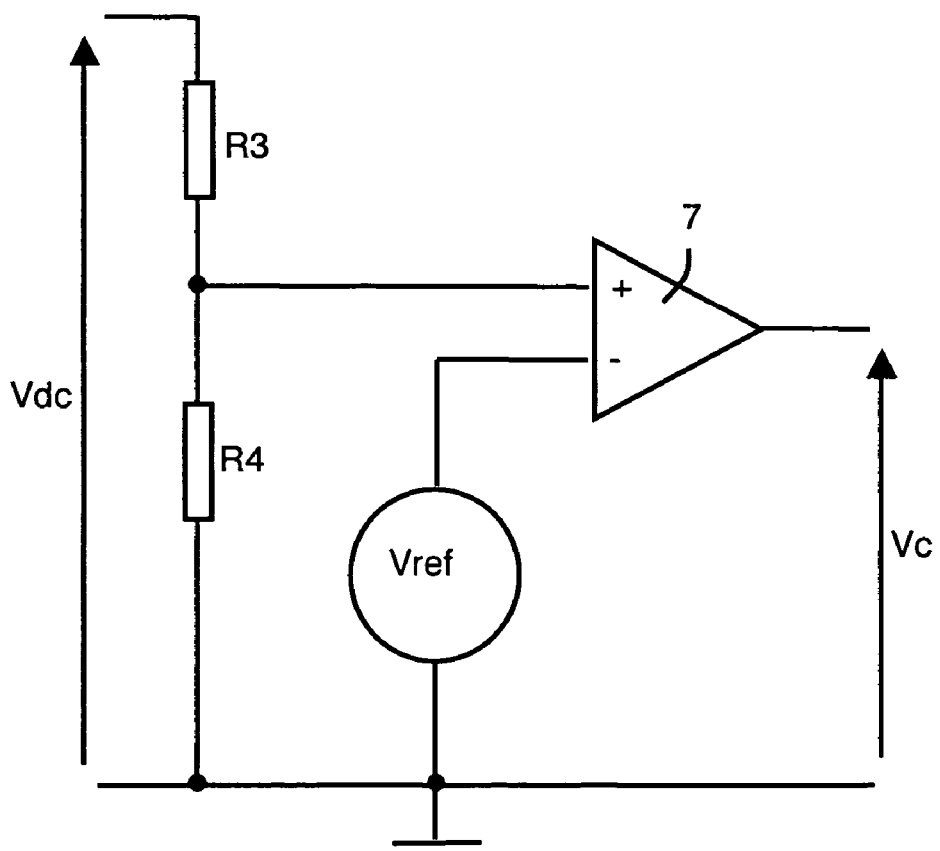

In a portable object 1 according to FIG. 1, comprising a regulation loop, the change of level of the amplitude of the emitted field causes a change of level of the electromotive force and consequently a fast variation (decreasing at the time t1 and increasing at the times t3, t5 and t7) of the amplitude of the AC voltage Vac generated at the terminals of the antenna 3 and of the load impedance Z. The regulation loop reacts to this variation by modifying the control voltage Vc of the impedance Z to bring the amplitude of the voltage Vac back to a preset regulated value after a transient period having a duration (t1-t2, t3-t4, t5-t6 or t7-t8) which depends on the passband of the regulation loop.

With this type of regulation loop, the level and variations of the AC voltage Vac are not representative of the levels of the emitted magnetic field, corresponding to the binary digital data to be transmitted. This is more particularly obvious between the times t3 and t9, corresponding to increasing values of the level of amplitude of the emitted magnetic field, for which the passage from one level to the immediately higher level causes the same variations of the voltage Vac. However, as represented in FIG. 9, after the transient period, the amplitude of the control voltage Vc, on output from the regulator 6, is proportional to the amplitude of the emitted magnetic field. The amplitude of the control voltage Vc is therefore representative of the level of amplitude of the emitted magnetic field and consequently of the data to be transmitted.

Figure 10:
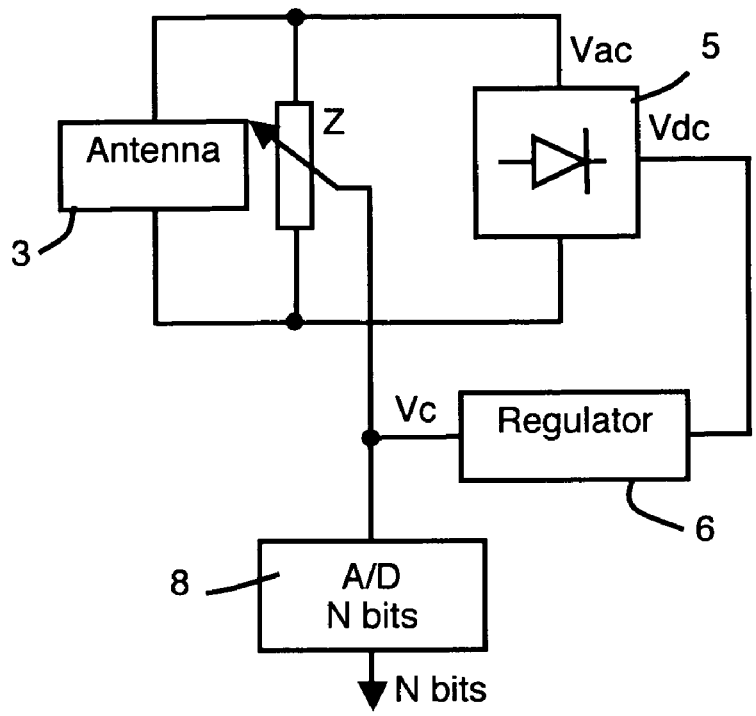
FIG. 10 represents a device enabling multi-level demodulation.

The portable object represented in FIG. 10 uses the control voltage Vc to perform multi-level demodulation of the data transmitted between the fixed station 2 and the portable object. This portable object differs from the portable object according to FIG. 1 by the addition of an N-bit analog-to-digital converter 8 (A/D), having its input connected to the output of the regulator 6 and which supplies the demodulated data in the form of N-bit words on output. However, the variations of the control voltage Vc are small, in particular when the variable load impedance Z is formed by a MOS type transistor having its gate connected to the output of the regulator 6. The control voltage Vc in fact then varies between the threshold voltage of the transistor and the threshold voltage plus a few hundred millivolts. This imposes a high resolution of the analog-to-digital converter 8, which may give rise to problems at the level of the consumption thereof and of the necessary silicon surface.

To avoid these problems, the current flowing through the load impedance Z can be used as a quantity representative of the transmitted data, the analog-to-digital converter 8 then being connected to the output of a current measuring interface. The variations of this current are in fact substantially greater than those of the control voltage Vc. However, although these large variations constitute an advantage when the portable object 1 is situated at a predetermined distance from the fixed station 2, this does cause a problem if the portable object has to be able to be used over a wide range of distances. A complete range of distances can for example typically correspond to currents ranging from a few microamps to a few tens of milliamps. This very wide range requires a very high resolution of the analog-to-digital converter 8 and/or addition of a system enabling the problem of the distance between the portable object 1 and the fixed station 2 to be overcome. Such a system, notably comprising automatic gain control and/or automatic range selection circuits, makes the demodulation circuit of the portable object more complex.

Figure 11:
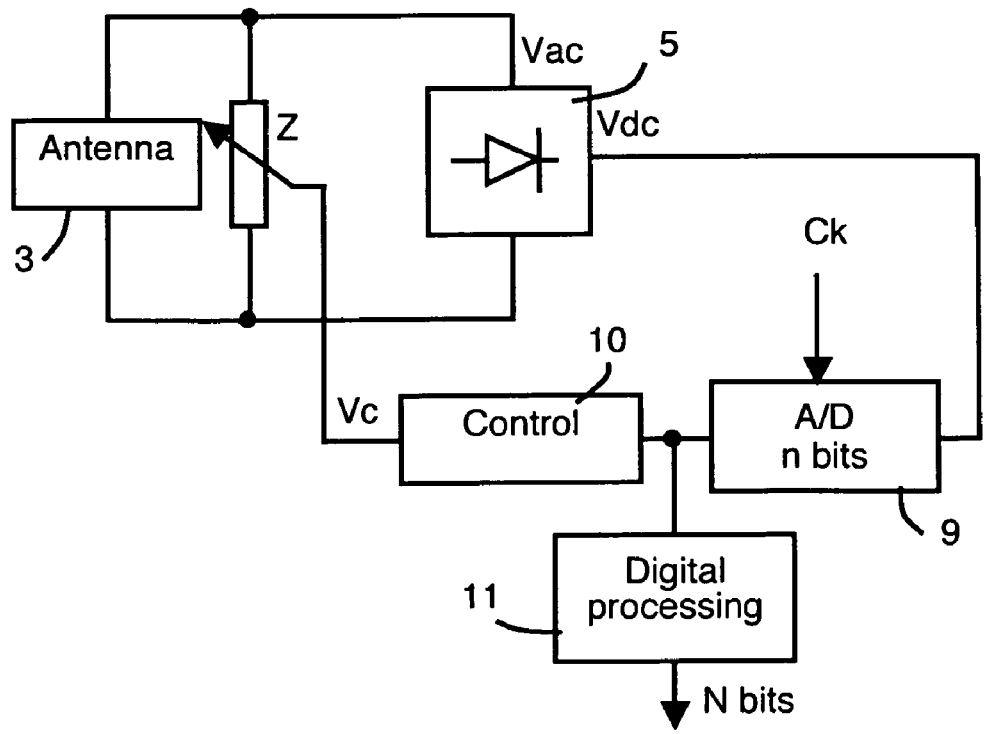
FIG. 11 represents a device according to the invention.

The portable object represented in FIG. 11 enables these drawbacks to be overcome. For this, an n-bit analog-to-digital converter 9 (A/D) is connected in the regulation loop, between the rectifier circuit 5 and a control circuit 10 supplying the control voltage Vc designed to control the load impedance Z. In a preferred embodiment, $N \geq 2$ and n<N. The analog-to-digital converter 9 is preferably a one-bit converter (n=1), which can thus be formed by a simple comparator. This very low resolution, which enables the number of components to be reduced to the minimum, is compensated by a high time resolution, obtained by clocking the converter 9 at an oversampling frequency much higher than the frequency of the data transmitted by the fixed station. The oversampling frequency is determined by a clock circuit supplying clock signals Ck to a clock input of the converter 9. For example, for a data frequency of about 200 kHz, the oversampling frequency can advantageously be comprised between 10 and 20 MHz. Although the output digital signals of the converter 9 contain the necessary information for recovery of the data transmitted by the fixed station 2, these digital signals are not directly usable. The output of the converter 9, connected to the control circuit 10, is therefore in addition connected to the input of a digital processing circuit 11 designed to supply the demodulated data on N bits.

Figure 12:
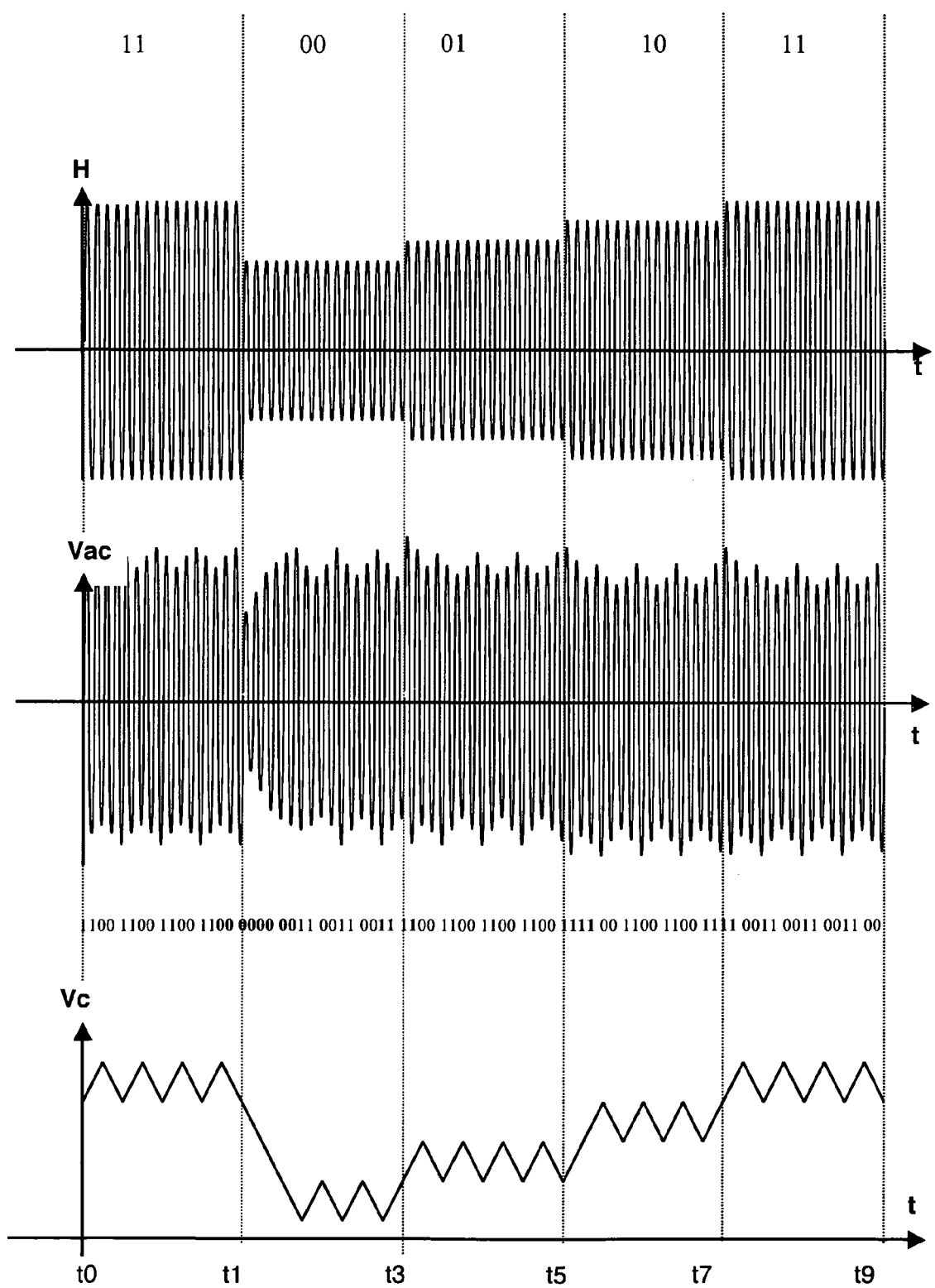
FIG. 12 represents different signals obtained in a device according to FIG. 11.

Operation of the demodulation circuit of the portable object of FIG. 11 is illustrated by the signals represented in FIG. 12, in the case where the low-resolution analog-to-digital converter 9, included in the regulation loop of the AC voltage Vac at the terminals of the antenna 3, is formed by a simple comparator (n=1) supplying a sequence of bits at the oversampling frequency. The control circuit 10 is formed by an integrator supplying an analog voltage signal Vc representative of the n-bit output signals of the converter, for example in the form of a rising voltage ramp when the output of the converter 9 is at 1 and of a descending voltage ramp when this output is at zero. The control voltage Vc, obtained on output from the control circuit 10, is therefore never static. Thus, after a transient period, when the regulation loop is in an equilibrium position, the control voltage Vc has the form of a saw-tooth signal around a mean level proportional to the level of the electromotive force, i.e. proportional to the level of the magnetic field emitted by the fixed station 2 and, consequently, representative of the data transmitted by the fixed station.

In the example illustrated in FIG. 12, the magnetic field H varies between the times t0 and t9 in the same way as in FIG. 9. The change of level of the amplitude of the emitted magnetic field H causes a change of level of the electromotive force and, consequently, a rapid variation (decreasing at the time t1 and increasing at the times t3, t5 and t7) of the AC voltage Vac generated at the terminals of the antenna 3 and of the load impedance Z. The digital output of the converter 9, which compares the amplitude of the rectified voltage with a preset threshold, is then formed by a sequence of bits at the oversampling frequency and, more particularly, by an alternation of pairs of 0's and of pairs of 1's: 1100110011001100 between the times t0 and t1, 0000001100110011 between the times t1 and t3, 1100110011001100 between the times t3 and t5, 1111001100110011 between the times t5 and t7 and 1100110011001100 between the times t5 and t7. A decrease of the level of the emitted magnetic field is therefore expressed (for example at the time t1) by emission of more than two consecutive 0's, thus causing a decrease of the mean amplitude of the control voltage Vc. In like manner, an increase of the level of the magnetic field emitted is expressed (for example at the times t3, t5 and t7) by emission of more than two consecutive 1's, causing an increase of the mean amplitude of the control voltage Vc. The number of consecutive 0's or 1's increases with the amplitude of the electromotive force jump. The digital signals output from the converter 9 thus contain information representative of the sign and of the amplitude of the level variation of the electromotive force generated by the emitted magnetic field, in other words information representative of the derivative of the envelope of the electromotive force or of the magnetic field. The digital processing circuit 11, designed to transform this information into binary digital signals representative of the transmitted data, therefore comprises at least a digital integration function. The integration functions of the control circuit 10 and/or of the digital processing circuit 11 can be performed by means of integrators and/or low-pass filters.

Thus, in the embodiment of FIG. 11, the regulation loop simultaneously performs a part of the analog-to-digital conversion, which makes the whole assembly more compact. Moreover the effect of possible slow variations of the mean magnetic field level, due to a movement of the portable object 1, is attenuated by the fact that the information output from the converter 9 is representative of the derivative of the envelope of the magnetic field. Slow variations of the mean field level are therefore treated as noise and do not disturb demodulation. Postponement of part of the processing digitally in the digital processing circuit is also advantageous.

On the other hand, the load impedance Z is continuously modulated, even at constant field, and this may disturb communication in the opposite direction, between the portable object and the fixed station. This drawback can however be overcome by disabling the regulation loop during emission of data modulated by the portable object.

To further overcome the problems of mean field variations, it is possible to adapt some characteristics of the control circuit 10, for example the slope of the ramps of the control voltage Vc, to the mean magnetic field by means of a pass-band loop substantially narrower than that of the main control loop.

Figure 13:
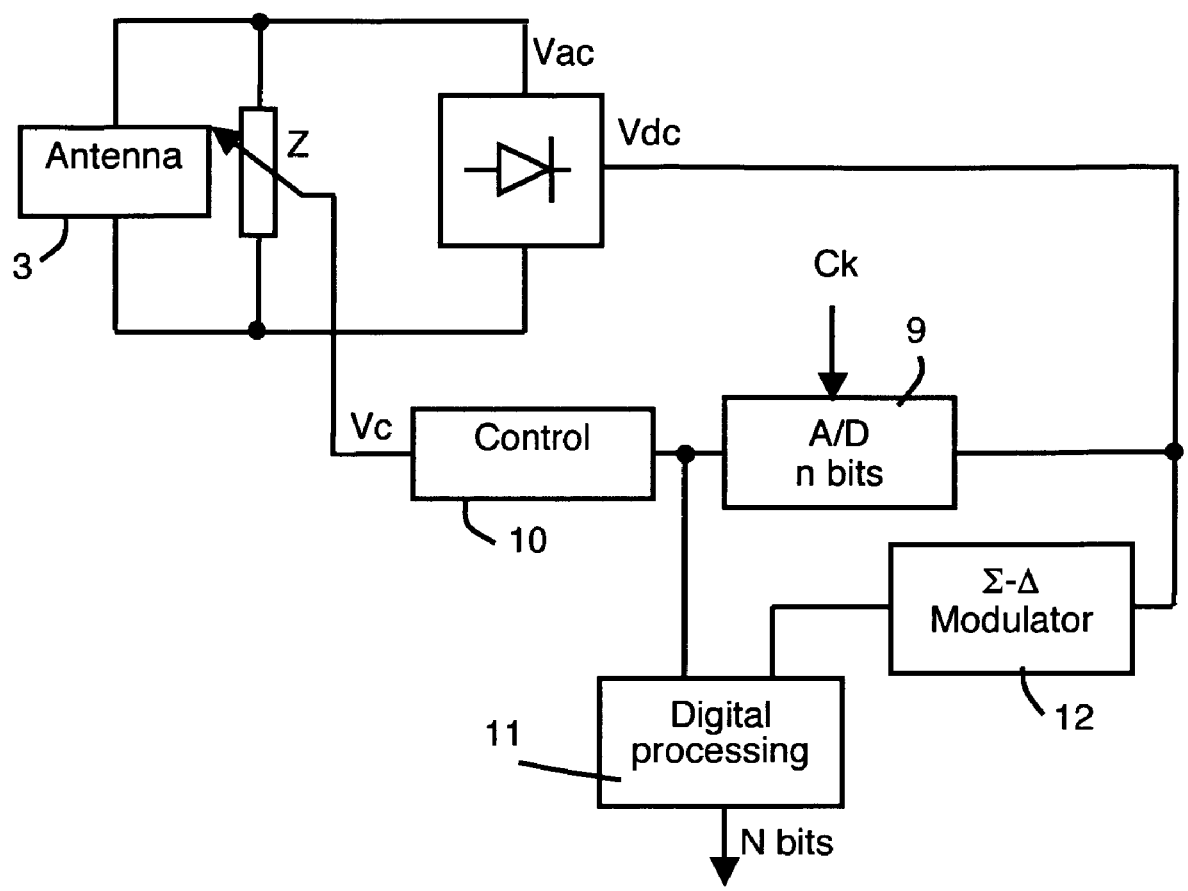
FIG. 13 illustrates an alternative embodiment of a device according to the invention.

The alternative embodiment of FIG. 13 enables the resolution of the demodulation to be increased by reducing the influence of the quantification noise generated by the low-resolution analog-to-digital converter 9. For this, a sigma-delta type modulator 12 is connected between the input of the analog-to-digital converter 9 and an additional input of the digital processing circuit 11. The input of the converter 9 (rectified voltage Vdc) is thus converted, by the modulator 12, into an oversampled binary signal and this oversampled binary signal is combined with the output of the converter 9 in the digital processing circuit to supply the demodulated data in the form of N-bit words.

The invention claimed is:

1. Remote transmission device comprising a fixed station and a portable object provided with an antenna inductively coupled to the fixed station, the portable object comprising a variable load impedance connected to terminals of the antenna, and a regulation loop regulating the voltage at terminals of the variable load impedance comprising rectifier means for rectifying the voltage at the terminals of the antenna and control means designed to modify the variable load impedance according to the output voltage of the rectifier means, object characterized in that, the fixed station emitting an alternating magnetic field modulated in amplitude on $2^N$ levels by data to be transmitted, encoded on N bits, the portable object comprises demodulation means comprising an n-bit analog-to-digital converter, clocked at an oversampling frequency much higher than the frequency of the data and connected between the rectifier means and the control means, and digital processing means connected to the output of the converter.

2. Device according to claim 1, wherein the respective values of N and n are such that $N \geq 2$ and $n < N$.

3. Device according to claim 1, wherein the digital processing means comprise digital integration means supplying N-bit signals representative of the transmitted data.

4. Device according to claim 1, wherein the control means comprise integration means supplying an analog voltage signal representative of the n-bit output signals of the converter.

5. Device according to claim 4, wherein the integration means comprise a low-pass filter.

6. Device according to claim 1, wherein n=1.

7. Device according to claim 6, wherein the converter is formed by a comparator.

8. Device according to claim 1, wherein N=2.

9. Device according to claim 1, wherein the variable impedance comprises a MOS type transistor.

10. Device according to claim 1, comprising a modulator, of sigma-delta type, connected between the input of the analog-to-digital converter and an additional input of the digital processing means.

* * * * *